United States Patent Office 3,177,246
Patented Apr. 6, 1965

3,177,246
PREPARATION OF HEXACHLOROCYCLOPENTA-
DIENE ADDUCTS OF BETA - SUBSTITUTED
NAPHTHALENES
Melvin Look, El Cerrito, Calif., assignor to Fundamental
Research Company, Berkeley, Calif., a partnership
No Drawing. Filed Oct. 5, 1961, Ser. No. 143,049
1 Claim. (Cl. 260—515)

This invention relates to dienic adducts of certain beta-substituted naphthalenes, and is concerned particularly with those adducts in which hexachlorocyclopentadiene is the dienic component, and certain mono-beta-alkyl naphthenes and their halogenated and/or oxidized derivatives are the dienophilic members.

Diels-Alder di-adducts of hexachlorocyclopentadiene (as the diene) and naphthalene and anthracene (as the dienophiles) are described in the U.S. Patent No. 2,658,-926 to Hyman and Danish. In said patent the reaction product of one mole of naphthalene and two moles of hexachlorocyclopentadiene is described as a polychlorinated, partially hydrogenated triphenylene. The Chemical Abstracts name for this reaction product is 1,2,3,4,5,6,7,8,13,13,14,14-dodecachloro-1,4,4a,4b,5,8,
8a,12b-octahydro-1,4;5,8-dimethanotriphenylene I have found on attempting to carry out similar adductions with substituted naphthalenes and using the conditions as taught by Hyman and Danish, that alpha substitution on the naphthalene nucleus acts as an effective steric bar to dienic adduction, but that the presence of a single beta-substituent offers no such obstacle per se and that such adducts can be produced, the adduction occurring exclusively on the unsubstituted naphthalene ring. Only such single beta substituents are permissible, however, which do not react destructively with hexachlorocyclopentadiene under the conditions of reaction. Thus, for example, beta-methoxynaphthalene, beta-naphthol, and beta-naphthylamine cannot be used successfully in this reaction, since the naphthalene substituents are attacked by hexachlorocyclopentadiene with the formation of tars and other undesirable by-products.

Among the beta-substituents of naphthalene which we have found most suitable for adduction by hexachlorocyclopentadiene are alkyl, oxidized alkyl, and halogenated alkyl groups in which the substituent group is connected to the ring carbon by a carbon to carbon linkage.

The adducts thus formed may be oxidized and/or further reacted with halogens, nitric and/or sulfuric acid, or with chlorosulfonic acid or other appropriate agent and the resulting products may then be pyrolyzed according to the method of Hyman and Silverman, described in U.S. Patent No. 2,658,913. Where both oxidation of the side chain and substitution into the remaining unhindered (beta) position of the unadducted ring of the adducts are contemplated, it is expedient to have substitution precede oxidation, since the reverse order of operation is made extremely difficult by the well-known tendency of carboxyl groups to hinder ortho-substitution in an aromatic system. Thus, for example, the beta-methyl adduct may be nitrated, sulfonated or chlorinated readily in beta position ortho to the beta-methyl group, whereas it is most difficult to achieve such reactions if the beta-methyl group is first oxidized to a carboxyl group.

The end products formed by the pyrolysis of the further reacted adducts of the preceding paragraph are substituted naphthalenes, useful as intermediates in a number of the organic chemical arts, particularly in the production of azoic and other dyestuffs, as will be discussed in greater detail hereinafter.

A principal object of the invention is therefore a process for preparing the Diels-Alder adducts of hexachlorocyclopentadiene and certain selected beta-substituted naphthalenes.

Another object of the invention is a process for preparing derivatives of the Diels-Alder adducts of hexachlorocyclopentadiene and certain selected beta-substituted naphthalenes, and, if desired, subsequently pyrolyzing these derivatives to regenerate hexachlorocyclopentadiene and to form naphthalene derivatives useful in the chemical arts.

Still another object of the invention is a novel process for preparing certain 2,3-disubstituted naphthalenes.

The obtaining of Diels-Alder adducts of hexachlorocyclopentadiene and certain selected beta-substituted naphthalenes constitute another object of the invention.

The manner of attainment of these and other objects of the invention will become apparent on the further reading of this specification and the claim.

As indicated above, the essence of my invention is my discovery that (1) alpha substitution in the naphthalene ring is an effective bar to adduction with hexachlorocyclopentadiene, but that (2) adduction can occur with certain single substituents in the beta position which will not react destructively with hexachlorocyclopentadiene, the adduction taking place exclusively on the unsubstituted ring; and that (3) the resulting adducts may be further reacted and the reaction products subsequently pyrolyzed to form substituted naphthalene derivatives useful in many ways in the chemical arts, and especially as intermediates in the preparation of certain dyestuffs. These reactions are in a way analogous to those disclosed by Hyman and Silverman in U.S. Patent No. 2,658,913. It could not, however, be predicted from the Hyman and Danish disclosure that adduction could not occur with those mono-substituted naphthalenes where the substituent was in the alpha position, that adduction could occur with naphthalene substituents in the beta position, that only certain of such beta substituted naphthalenes would adduct, and that adduction, when it did occur, would be on the unsubstituted ring; for, from the work of Kloetzel and associates (Jour. Amer. Chem. Soc. 72, 273, 1991 (1950)) and from chemical electronic theory, it might be expected that adduction, if it occurred at all, would take place on the substituted ring.

The rates of adduction in the practice of the present invention are rather slow. Typical reaction times are from about 1 to 10 days, at a preferred temperature range of about 140° C. to 180° C.

A more detailed understanding of the principles and practice of my invention may be obtained from the examples given below for purposes of illustration but obviously not of limitation.

EXAMPLE I

Preparation of the Diels-Alder diadduct of 2-methylnaphthalene and hexachlorocylopentadiene A solution of 16.4 grams of hexachlorocyclopentadiene and 2.8 grams of 2-methylnaphthalene was heated at 150° C. to 155° C. for 7 days. At the end of that time, the unreacted hexachlorocyclopentadiene and 2-methylnaphthalene were removed by vacuum distillation. The residue solidified on cooling to give 4.2 grams of the adduct composed of two moles of hexachlorocyclopentadiene with one mole of 2-methylnaphthalene. The product was purified by recrystallization first from hexane and then from methanol. The melting point of the compound was 155° C. to 158° C. The molecular weight was determined and found to be 690±14, as compared with the theoretical value of 688 for $C_{21}H_{10}Cl_{12}$. Chlorine was found to be 60.44 percent, compared with the theoretical 62 percent. The structural formula of the adduct, confirmed by infra-red spectrophotometric analysis, is the following:

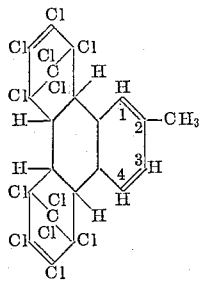

I have found that the preparation described in this example can be improved in some respects by keeping the temperature of the adduction mixture at about 140° C. to 145° C. instead of the 150° C to 155° C. range specified in the example. The reaction is somewhat slower at the lower temperature, but the product is cleaner. Another improvement in the clarity of the adduction reaction and its subsequent ease of work-up is accomplished by excluding air from the adduction mixture by blanketing the mixture with carbon dioxide, nitrogen, or other inert gas.

The diadduct thus prepared is useful in itself, e.g., as a flameproofing agent; but it is most valuable as a starting material for the preparation of other commercially important organic chemicals, as, for example, 3-nitro-2-methylnaphthalene which may be prepared by nitration of the diadduct and pyrolysis of the nitrated product. This preparation is described in the next two examples.

EXAMPLE II

Nitration of the diadduct

A solution of 2.40 grams by weight of the diadduct, as prepared in Example I, in a mixture of 30 grams 98% white fuming nitric acid and 52 grams methylene chloride was allowed to stand at room temperature for 30 minutes. The solution was then diluted with excess water, and the organic phase separated. Evaporation of the solvent left the 3-nitro-2-methyl adduct, whose structural formula, confirmed by I.R. spectrophotometric analysis, is the following:

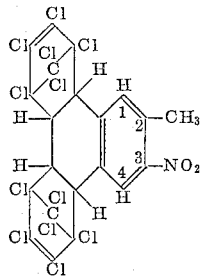

Other concentrations of nitric acid, other nitrating agents and solvents, and other procedures may be employed to effect this nitration; but I prefer to use the 98% nitric acid and methylene chloride mixture described above in accordance with the disclosure of Julius Hyman and Herbert P. C. Lee in their co-pending application, Serial No. 65,281, filed October 27, 1960.

EXAMPLE III

Pyrolysis of the 3-nitro-2-methyl diadduct

A slurry of 1 part by weight of 3-nitro-2-methyl diadduct, as prepared in Example II, in 2 parts by weight of hexachlorocyclopentadiene was thermally decomposed at 350° C. to 400° C. in a wiped-film molecular-type still. I have found this type of still greatly superior, insofar as yields are concerned, to the conventional pot still for pyrolysis work of this kind. The products resulting from the pyrolysis were removed by fractional vacuum distillation. Recrystallization of the distillate from hexane gave 3-nitro-2-methylnaphthalene melting at 119° C. to 121° C. (Fisher-Johns apparatus), compared with the 117° C. to 118° C. reported in the literature. The structure of the compound, confirmed by conversion of the compound by oxidation and reduction to the better known 3-amino-2-naphthoic acid, is the following:

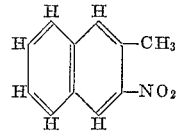

As was noted earlier in this specification, 3-nitro-2-methylnaphthalene is potentially an important starting material for the manufacture of many other substituted naphthalenes of great commercial value as intermediates in the dyestuff and other organic chemical industries. Thus, for example, it can readily be converted by known methods, as by oxidation of the methyl group and reduction of the nitro group, to 3-amino-2-naphthoic acid, which can then be converted via the "reverse Bucherer" reaction into 3-hydroxy-2-naphthoic acid, otherwise called beta-oxy-naphthoic acid, the "BON acid" of commerce. Alternatively by the use of my method, BON acid may be prepared by sulfonating the 2-methyl adduct in the remaining (neighboring) beta position, then oxidizing the methyl group to a carboxylic acid, and pyrolyzing the resulting carboxylic-sulfonic acid with loss of hexachlorocyclopentadiene and water to form the 2,3-naphthalene carboxylic-sulfonic mixed anhydride, and then heating this compound with alkali, followed by acidification. BON acid is one of the most important of the substituted naphthalenes, being the basic intermediate for most of the so-called azoic dyestuffs as well as for certain parasiticides; it is currently being produced in the United States exclusively by the standard Kolbe-Schmitt process to the extent of nearly three million pounds per year.

EXAMPLE IV

Reduction of the 3-nitro-2-methyl diadduct

A mixture of 8.0 grams of the 3-nitro-2-methyl diadduct, prepared according to Example II, 8.0 grams of stannous chloride hydrate, 120 grams of isopropyl alcohol, and 20 grams of concentrated hydrochloric acid was refluxed at about 80° C. for two hours. The resulting solution was diluted with an excess of water, and the light-colored 2-methyl-3-amino-diadduct which precipitated was filtered off, washed with water, and dried. The yield was quantitative. The structure of the product was established by infra-red spectroscopic analysis.

Besides the nitration described in Example II, the 2-methyl diadduct may be subjected to a variety of other treatments, such as oxidation, sulfochlorination, sulfonation, etc. Two such treatments are described in the following two examples.

EXAMPLE V

Oxidation of the 2-methyl diadduct

To a solution of 3 grams chromium trioxide in 25 grams glacial acetic acid was added 5 grams of the 2-methyl diadduct incrementally in gram portions. After an initial mildly exothermic reaction, the stirred mixture was heated under reflux (118° C.) for 18 hours. The green mixture was diluted with twice its volume of water, boiled, and cooled. The white solids were filtered off, washed with water, and dried. The product was shown by infra-red spectroscopy to be 2-carboxy diadduct. The yield was 77 percent of the theoretical.

EXAMPLE VI

Sulfochlorination of the 2-methyl diadduct

A solution of 50 grams of the 2-methyl diadduct in 325 grams of methylene chloride was cooled in an ice bath. To this solution, while stirred, was added dropwise 26.2 grams of chlorosulfonic acid. The violet solution then was heated under reflux for one hour. The solution was poured into an equal volume of ice water. The mixture was stirred and heated to drive off the methylene chloride. The light-colored solid was filtered off, washed with water and dried, giving a quantitative yield of 2-methyl-3-sulfonylchloro diadduct, the structure of which was confirmed by infra-red spectrophotometric analysis.

In the following Examples VII, VIII, IX and X are described the preparation of adducts of hexachlorocyclopentadiene with beta-substituted naphthalenes in which the beta substituents are other alkyl, oxidized alkyl, and halogenated alkyl groups.

EXAMPLE VII

*Adduction of hexachlorocyclopentadiene and 2-ethylnaphthalene*

A solution of 5 grams of 2-ethylnaphthalene in 17.5 grams of hexachlorocyclopentadiene was heated for seven days at 150° C.–155° C. under an inert atmosphere of carbon dioxide. Upon cooling, the 2-ethyladduct of two moles of hexachlorocyclopentadiene and one mole of 2-ethylnaphthalene crystallized out. The solid was washed with 1:1 benzene-methanol to move the unreacted starting materials, and the structure of the purified reaction product was established by infra-red spectroscopic analysis.

EXAMPLE VIII

*Adduction of hexachlorocyclopentadiene and 2-naphthoyl chloride*

A solution of 4.0 grams of 2-naphthoyl chloride in 17.2 grams of hexachlorocyclopentadiene was heated for seven days at 150° C.–155° C. under an inert atmosphere (carbon dioxide). The reacted solution containing the adduct of hexachlorocyclopentadiene and 2-naphthoyl chloride was then dissolved in an equal volume of n-hexane, whereupon the dissolved adduct quickly hydrolyzed in moist air to precipitate the 2-carboxyl diadduct, which was washed with more hexane and dried. Spectroscopic analysis of the product showed it to be identical with that obtained by the oxidation of the 2-methyl diadduct as described in Example IV.

EXAMPLE IX

*Adduction of hexachlorocyclopentadiene with 2-naphthoic acid*

A solution of 25.4 grams of hexachlorocyclopatadiene and 5.3 grams of 2-naphthoic acid was heated at 150° C.– 155° C. for 7 days under an inert atmosphere (carbon dioxide). The mixture was diluted with 35 grams of n-hexane. The solid unreacted 2-naphthoic acid and its anhydride was filtered and washed well with hexane. The combined filtrate and washings, after standing overnight, formed a precipitate containing 2-carboxy diadduct in small yield. The structure of the compound was established by I.R. spectroscopy.

EXAMPLE X

*Adduction of hexachlorocyclopentadiene with 2-bromomethylnaphthalene*

A solution of 4.5 grams of 2-bromomethylnaphthalene and 16.7 grams of hexachlorocyclopentadiene was heated at 140° C. for 24 hours. Ananlysis of the resulting solution by I.R. spectroscopy showed the presence of 2-bromo-methyl diadduct in low yield.

Numerous variations and modifications of the processes and products of my invention will naturally suggest themselves to one skilled in the chemical and related arts involved. All such variations and modifications are deemed to be comprehended within the scope of the invention as defined in the claim.

I claim:

A process for preparing a beta-substituted 1,2,3,4,5,6,7,8,13,14,14,14-dodecachloro - 1,4,4a,4b,5,8,8a,12b-octahydro-1,4;5,8-dimethanotriphenylene having but a single substituent in a beta position, said substituent being selected from the class consisting of $CH_3, C_2H_5, CO_2H, COCl,$ and $CH_2Br$ groups, said process comprising reacting hexachlorocyclopentadiene at a temperature of about 140° C. to 180° C. for a period of about one to ten days with a substituted naphthalene having but a single substituent in a beta position, said substituent being selected from said class.

References Cited by the Examiner

UNITED STATES PATENTS 2,658,913 11/53 Hyman et al. _____ 260—543
2,658,926 11/53 Hyman et al. _____ 260—649

OTHER REFERENCES

Danish et al.: "J. Am. Soc.," vol. 76 (1954), pp. 6144–6150.

LEON ZITVER, *Primary Examiner.*

CHARLES B. PARKER, *Examiner.*